(12) United States Patent
Konagaya (10) Patent No.: US 7,099,047 B2
(45) Date of Patent: Aug. 29, 2006

(54) IMAGE SCANNER

(75) Inventor: Tatsuya Konagaya, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1060 days.

(21) Appl. No.: 10/105,396

(22) Filed: Mar. 26, 2002

(65) Prior Publication Data

US 2002/0140992 A1     Oct. 3, 2002

(30) Foreign Application Priority Data

Mar. 28, 2001  (JP) .............................. 2001-093897
Jan. 17, 2002  (JP) .............................. 2002-008463

(51) Int. Cl.
H04N 1/40 (2006.01)
H04N 1/407 (2006.01)

(52) U.S. Cl. ..................................... 358/3.26; 358/461

(58) Field of Classification Search ................. 358/1.9, 358/3.26, 461; 382/274; 348/241, 251
See application file for complete search history.

(56) References Cited

U.S. PATENT DOCUMENTS 6,122,406 A * 9/2000 Okubo ........................ 382/274

FOREIGN PATENT DOCUMENTS

JP          04035168 A  *  2/1992

* cited by examiner

Primary Examiner—Scott A. Rogers
(74) Attorney, Agent, or Firm—Sughrue Mion, PLLC (57) ABSTRACT

In an image scanner, an optical image is formed on a CCD image sensor through a lens unit from rays traveling through a picture frame placed in a film carrier, so image signals are picked up from the picture frame. The image signals are corrected with shading correction data that are read out from a memory in accordance with the magnification of the lens unit. The memory previously stores shading correction data for frequently used magnification steps. Shading correction data for less frequently used magnification are previously stored in a hard disc. If the lens unit is set at a magnification for which the memory does not store suitable shading correction data, the suitable shading correction data are read out from the hard disc, and written on the memory.

17 Claims, 7 Drawing Sheets

IMAGE SCANNER

BACKGROUND OF THE INVENTION

1. Field of the Invention

The present invention relates to an image scanner for reading out an image photoelectrically from an original, and more particularly to an image scanner provided with a shading correction device.

2. Background Arts

As an image scanner for reading out an image photoelectrically from an original, a reflective scanner for a reflective original and a film scanner for a photographic film have been known. The image scanner comprises a light source for illuminating the original, a photoelectric conversion device that converts an optical image into electric signals, and an image forming lens for forming an optical image of the original on the photoelectric conversion device. As the light source, a halogen lamp may be cited as an exemplar. As the photoelectric conversion device, an image sensor, like CCD (charge-coupled device), has been widely used. In the reflective scanner, the light reflected from the original is projected as an optical image onto the image sensor through the image forming lens. In the film scanner, the light traveling through a picture frame of the photographic film is projected as an optical image onto the image sensor through the image forming lens.

As well known in the art, the quantity of light that travels through the image forming lens is not uniform but decreases with radial distance from an optical axis of the image forming lens, so the brightness decreases toward the edges of the image field, and thus the optical image formed through the lens tends to be darker in its marginal area than its central area. Moreover, the quantity of illumination light from the light source is not always uniform in a perpendicular plane to the optical axis, i.e. on the surface of the original. For these reasons, even if the original has an uniform brightness or an uniform transmittance density, the optical image formed on the image sensor does not have an uniform luminance. Such an evenness is called "shading".

In order to obtain high-quality image, it is usual in the image scanner to process the image signals from the image sensor so as to eliminate the influence of shading. For instance, image signals are detected through the image sensor without placing any original or while placing a reference original having an uniform density, and the value of the image signal of each individual pixel, i.e. a luminance value, is compared to a predetermined reference value. Then, a correction coefficient is calculated for each individual pixel such that the image signals after being corrected with the correction coefficients for the respective pixels have the same value as the reference value. By correcting image signals actually obtained from an original image with these correction coefficients, the influence of shading is eliminated from the image signals. Hereinafter, such a correction process will be referred to as shading-correction.

On the other hand, there are different sizes of photographic picture frames and originals, while it is desirable to maintain the size of the optical image formed on the image sensor as constant as possible in view of the image processing conducted later on the image signals. In addition, in view of the resolving power of the image scanner, it is preferable to form the optical image in a maximum size readable through a photoreceptive surface of the image sensor. For these reasons, it is conventional in the image scanner that the magnification of the image forming lens is controlled in accordance with the size of the original such that the optical image is formed in the maximum size on the image sensor. It is also conventional to form an optical image from a limited portion of the original by adjusting the magnification of the image forming lens appropriately. This treatment is called "cropping".

Because the size of the optical image formed on the image sensor varies with the magnification of the image forming lens, shading conditions of the optical image on the image sensor also varies with the magnification of the image forming lens. Therefore, it is desirable to set up different shading correction values for different lens magnification steps. However, where the image sensor has a great number of pixels, e.g. 3,200,000 pixels, a very large memory capacity is necessary for storing correction values determined for individual pixels with respect to individual magnification values available, e.g. eight magnification steps.

If the illumination light from the light source is well diffused and thus the luminance is well equalized, it is possible to reduce the requisite number of shading correction values. However, since the illuminance decreases as the light is more diffused, it is necessary to increase the light intensity of the light source in order to increase the degree of diffusion of the illumination light. Then, it becomes necessary to use a large size halogen lamp, which results in increasing the size and the manufacture cost of the image scanner.

For the sake of minimizing the image scanner and saving the power consumption, some image scanners use light emitting diodes (LED) as the light source. In that case, a large number of light emitting diodes are arranged in a matrix. Since the light intensity of the light source consisting of the LEDs is insufficient as compared to the halogen lamp, it is also necessary to correct the image signals with shading correction values which vary from pixel to pixel and also vary depending upon the magnification of the image forming lens. Accordingly, a large capacity memory for storing a large volume of shading correction data.

SUMMARY OF THE INVENTION

In view of the foregoing, an object of the present invention is to provide an image scanner that permits storing a large volume of shading correction data prepared for individual pixels for respective lens magnification steps, without the need for expanding the memory capacity of the image scanner.

Another object of the present invention is to provide an image scanner that achieves prompt shading-correction at any lens magnification.

To achieve the above objects, an image scanner according to the present invention comprises an image sensor for photoelectrically converting an optical image into image signals; a light source for projecting rays toward a scanning position; an image forming lens for forming an optical image on the image sensor from rays traveling through a transparent original or rays being reflected from a reflective original as placed in the scanning position, the image forming lens being changeable in magnification; a first storage medium for storing at least one of a plurality of sets of shading correction data prepared for a plurality of magnification steps of the image forming lens, one set for one magnification; a second storage medium for storing at least a second set of shading correction data which are prepared for a second one of the plurality of magnification steps of the image forming lens, and are not stored in the first storage medium; a data writing device that reads out the second set of shading correction data from the second storage medium and writes the second set of shading correction data on the first storage medium if the image forming lens is set at the second magnification step; and a shading correction device for correcting image signals from the image sensor with a set of shading correction data that are read out from the first storage medium in correspondence with the magnification used on picking up the image signals.

The image scanner configured as above achieves high-speed shading correction while storing a large volume of shading correction data.

The first storage medium is preferably a RAM, and the second storage medium is preferably a hard disc, CD, DVD, MO or a memory card. Then, the RAM may have a small capacity without lowering efficiency of shading correction.

According to a preferred embodiment, the image scanner further comprises a shading correction data taking device for taking the shading correction data for the plurality of magnification steps of the image forming lens, wherein the shading correction data taken by the shading correction data taking device are written on either the first storage medium or the second storage medium by the data writing device according to a predetermined sequence.

Even when the illuminating conditions of the image scanner changes because of a change in the light source or the like, proper shading correction data are obtained under the new illuminating conditions.

The data writing device preferably writes the shading correction data first on the first storage medium in the order from the most frequently used one to less frequently used one, and then writes those shading correction data on the second storage medium, which cannot be written on the first storage medium. Since the frequently used shading correction data are promptly read out from the first storage medium, the efficiency of data processing is improved.

It is preferable to write the second set of shading correction data as read out from the second storage medium on the first storage medium by interchanging the second set of shading correction data with a set of shading correction data which have been stored in the first storage medium. Then the first storage medium may have a requisite minimum capacity.

It is more preferable to select the least frequently used shading correction data among the shading correction data stored in the first storage medium as the shading correction data to be interchanged with the second set of shading correction data. Then the need for data interchange between the first storage medium and the second storage medium is lessened, so the highly efficient data processing is achieved. The same effect may be achieved by selecting the shading correction data to be interchanged with the second set of shading correction data depending upon a command entered by an operator, or ordering data.

According to another preferred embodiment, if the image forming lens is set at a particular magnification for which neither the first storage medium nor the second storage medium store shading correction data, the shading correction device reads out those shading correction data prepared for a magnification proximate to the particular magnification, and more preferably a magnification adjacent to and higher than the particular magnification. Then, it is unnecessary to detect a new set of shading correction data for the particular magnification.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
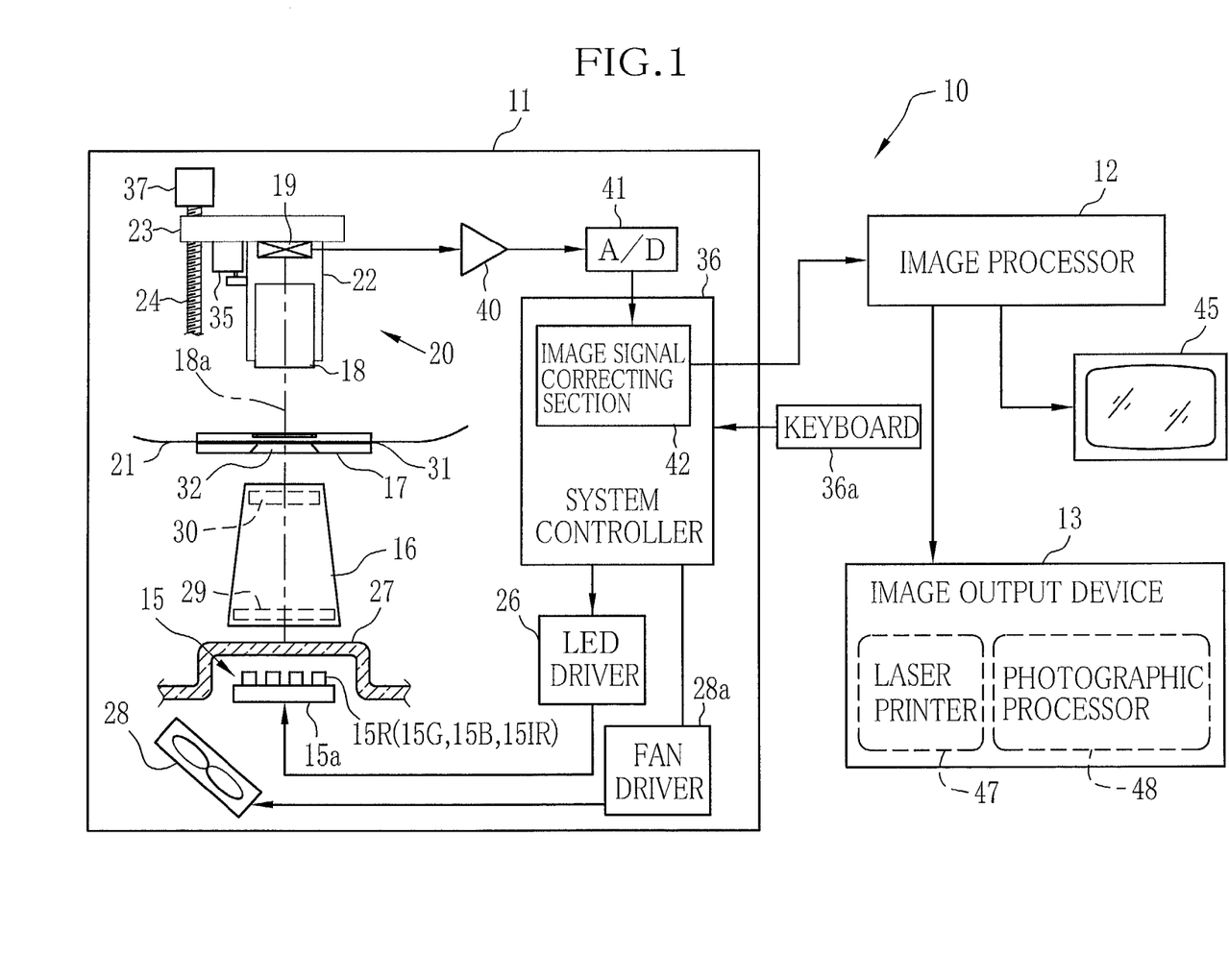
FIG. 1 shows a schematic diagram illustrating a digital photo-lab system using an image scanner according to an embodiment of the present invention.

In FIG. 1, a digital photo-lab system 10 is constituted of an image scanner 11, an image processor 12 and an image output apparatus 13. The image scanner 11 is mainly constituted of a light source 15, a diffusion box 16, a film carrier 17 and an imaging section 20, which are arranged in this order along an optical axis 18a of a lens unit 18 of the imaging section 20.

The light source 15 is constituted of a great number of LEDs 15R, 15G, 15B and 15IR, which respectively emit red (R), green (G), blue (B) and infrared (IR) rays, and are arranged in a matrix on a substrate 15a. An LED driver 26 drives the LEDs 15R, 15G, 15B and 15IR color by color under the control of a system controller 36, so the light source 15 illuminates a photo filmstrip 21 sequentially with the red, green, blue and infrared rays, as the photo filmstrip 21 is placed in an image scanning position defined in the film carrier 17. Designated by 27 is a transparent protection cover made of a transparent material, e.g. a transparent plastic, that protects the LEDs 15R, 15G, 15B and 15IR from damages. A cooling fan 28 is disposed in the vicinity of the light source 15, and is controlled by the system controller 36 via a fan driver 28a, such that the LEDs 15R, 15G, 15B and 15IR are maintained in a predetermined temperature range, thereby to suppress fluctuations in luminous intensity that would be resulted from temperature variations.

The diffusion box 16 has diffusion plates 29 and 30 on its top and bottom sides. The rays of each color from any of the LEDs 15R, 15G, 15B and 15IR enter the diffusion box 16 through the bottom diffusion plate 29 while being diffused through it. Inside the diffusion box 16, the rays are conducted upward by virtue of internal reflection. Then, the rays are projected toward the photo filmstrip 21 through the top diffusion plate 30, while being diffused through it. This way, the rays of each color has approximately uniform luminance when illuminating the photo filmstrip 21.

The film carrier 17 is selected from among several kinds in accordance with the type of the photo filmstrip 21 to carry, and is set in the image scanner 11. That is, the film carrier 17 has a film passageway 31 and an exposure opening 32 which are dimensioned to be suitable for a specific film type, e.g. ISO 135 type. The photo filmstrip 21 is advanced through the film passageway 31, and is positioned in the exposure opening 32 by means of a not-shown film advancing mechanism.

Figure 2:
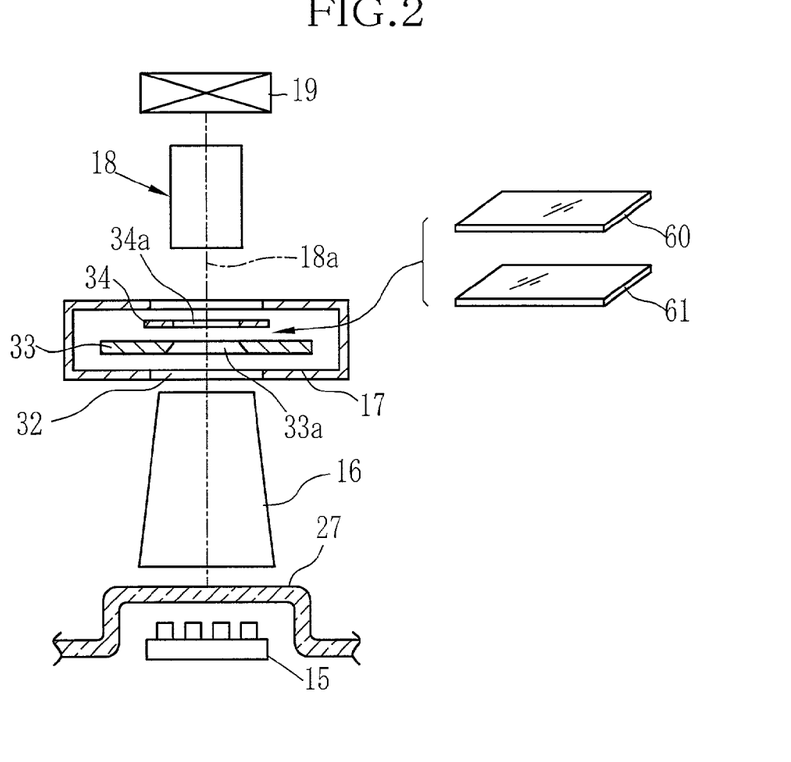
FIG. 2 shows a schematic diagram illustrating an imaging section of the image scanner according to the embodiment of FIG. 1.

As shown in FIG. 2, a lower mask 33 and an upper mask 34 are disposed inside the film carrier 17, which have rectangular openings 33a and 34a in correspondence with the exposure opening 32. As well known in the art, the upper mask 34 is moved upward away from the lower mask 33 while the photo filmstrip 21 is being advanced, and moved down to nip the photo filmstrip 21 between it and the lower mask 33 when the photo filmstrip 21 is positioned in the exposure opening 32, thereby to hold the photo filmstrip 21 flat during the scanning.

Referring back to FIG. 1, the imaging section 20 is provided with the lens unit 18, a CCD sensor 19, a lens barrel 22, a holder plate 23 and a guide rod 24. The lens unit 18 is held in the lens barrel 22, and the lens barrel 22 is mounted on the holder plate 23. The CCD sensor 19 is also mounted on the holder plate 23 in side the lens barrel 22. A magnification control motor 35, that is a pulse motor, is also mounted on the holder plate 23. The lens barrel 22 consists of a fixed barrel member and a movable barrel member, which are moved relative to each other by a driving force of the magnification control motor 35, such that the magnification of the lens unit 18 varies stepwise within a predetermined range, e.g. by 0.01 at each step and in a range from 0.25× to 0.85×. For this purpose, a requisite number of drive pulses to be applied to the magnification control motor 35 for setting the lens unit 18 from an initial position to each of the predetermined magnification steps is previously detected, and the respective drive pulse numbers are stored as a lookup table in the system controller 36. The system controller 36 reads out the drive pulse number in accordance with the film frame size of the photo filmstrip 21, or the magnification selected by the operator through a keyboard 36a, and drives the magnification control motor 35 by the drive pulses of the read number. The initial position of the lens unit 18 may be defined by a position sensor or by use of another conventional method. The film size may be automatically detected by a not-shown film data reading device provided in the film carrier 17, or may be entered manually through the keyboard 36a.

The guide rod 24 is a lead screw that is screwed through the holder plate 23 and is oriented in parallel to the optical axis 18a. The guide rod 24 is driven by a focusing motor 37. As the guide rod 24 turns, the holder plate 23 moves along the guide rod 24, so the lens unit 18 and the CCD sensor 19 move along the optical axis 18a, changing the distance between the photo filmstrip 21 and the CCD sensor 19 and thus the conjugate distance of the lens unit 18. Thereby, the lens unit 18 is focused such that an optical image of the picture frame of the photo filmstrip 21 as placed in the scanning position is formed on a photoelectric conversion surface of the CCD sensor 19 when the picture frame is illuminated by the rays from the LEDs 15R, 15G, 15B or 15IR.

The CCD image sensor 19 is an area image sensor having a matrix of pixels, e.g. 3,200,000 pixels, and converts the optical image formed thereon into electric image signals. The electric image signals are amplified through an amplifier 40, and is converted into digital image signals through an A/D converter 41. The digital image signals are sent to an image signal correcting section 42. The image signal correcting section 42 is provided for the shading correction on the image signals, and corrects the image signals with correction values as set forth in detail later. In this way, the image scanner 11 detects digital image data from the picture frame of the photo filmstrip 21.

The image scanner 11 picks up image data from the picture frames of the photo filmstrip 21 first at a low resolution while advancing the photo filmstrip 21 frame after frame another in one direction, and thereafter at a high resolution while advancing the photo filmstrip 21 frame after frame in the opposite direction. Scanning at the low resolution is called pre-scanning, whereas scanning at the high resolution is called fine-scanning. Conditions for the fine-scanning are determined for each individual picture frame on the basis of the image data picked up by the pre-scanning. Both in the pre-scanning and in the fine-scanning, image data for red, green and blue and image data for infrared are sequentially obtained from one picture frame by driving the LEDs 15R, 15G, 15B and 15IR sequentially from one color to another.

The image processor 12 conducts processing on the image data for red, green and blue as obtained through the fine-scanning, so as to improve quality of the image. First, with respect to the image data for infrared, those pixels having lower output values than a threshold value are detected as improper pixels that suffer from scratches or stains on the surface of the photo filmstrip 21. Then the three color image data of these improper pixels are corrected by interpolation or the like, thereby to avoid print quality deterioration resulted from the stains and scratches on the film surface.

Next, a print area within the picture frame is determined by the frame size data and a designated print size, and the image data of the print area are subjected to an electronic zooming process for changing the data size in accordance with the designated print size. Thereafter, the image data are subjected to a gradation correction process, a sharpness correction process and other image quality correction processes. Based on the processed three-color image data, a simulation image of a finished print is displayed on a monitor 45. The operator observes the simulation image and, if the image is satisfactory, enters a print command by operating the keyboard 36a. Then, the processed three-color image data are sent to the image output apparatus 13. The image processing is conducted on the image data of the respective picture frames to print.

The image output apparatus 13 consists of a laser printer section 47 and a photographic processor section 48. The laser printer section 47 is provided with a laser light source for red, green and blue, and a light modulator, though they are not shown in the drawings. As conventional, the light modulator modulates the lasers of the individual colors in accordance with the image data of the respective colors that are received from the image processor 12. The modulated lasers are swept across a color photographic paper, to record a latent image thereon. The color photographic paper with the latent image thereon is developed, bleached, fixed, rinsed and dried in the photographic processor section 48, thereby providing a photo-print.

Figure 3:
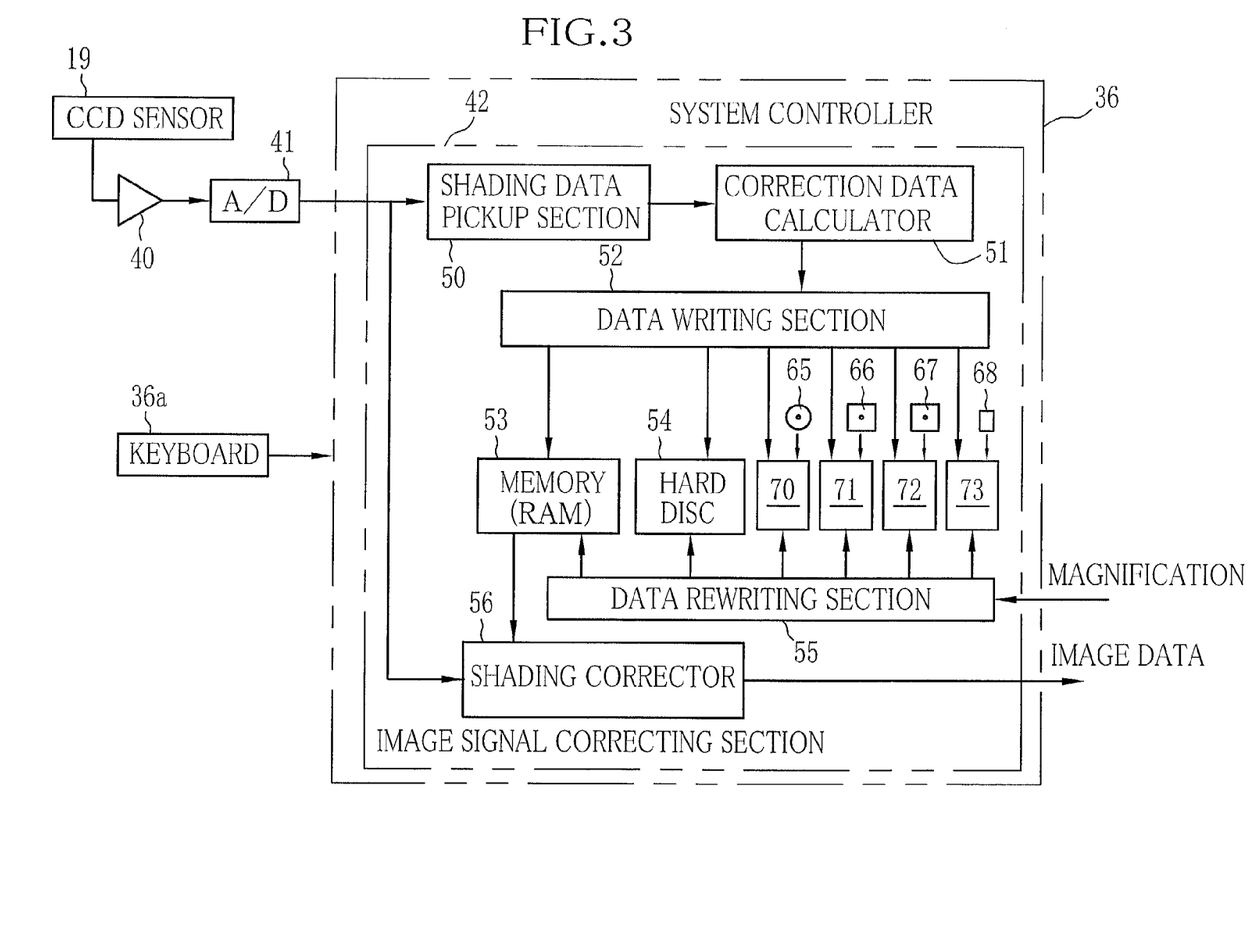
FIG. 3 shows a block diagram illustrating an image signal correcting section of the digital photo-lab system.

FIG. 3 shows the detail of the image signal correcting section 42. The image signal correcting section 42 is structured as a software device in the system controller 36, and comprises a shading data pickup section 50, a correction data calculator 51, a data writing section 52, a memory 53, a hard disc 54, a data rewriting section 55, and a shading corrector 56. The memory 53 is a random access memory (RAM) in this embodiment. It is possible to structure the image signal correction section 42 as a separate hardware device from the system controller 36.

When a shading correction data taking mode is selected by operating the keyboard 36a, the shading data pickup section 50 picks up shading data from image signals of all pixels which are detected through the CCD image sensor 19 without placing the photo filmstrip 21 in the film carrier 17, as shown in FIG. 2, and while changing the magnification of the lens unit 18 stepwise to predetermined several values. It is possible to let the image scanner 11 be set automatically to the shading correction data taking mode every time the image scanner 11 is activated.

The correction data calculator 51 calculates a correction coefficient C for each individual pixel based on the shading data obtained at each magnification in the shading data pickup section 50. For example, the highest signal value that represents the lowest density is selected as a reference value from among the image signals picked up as the shading data, and the correction coefficients C are determined such that the image signals of all pixels have the same value as the reference value after being multiplied by the respective correction coefficients C. The correction coefficients C for the respective pixels are stored as shading correction data Cnm, wherein "n" and "m" represent a column number and a row number in a matrix respectively.

However, as set forth above, because the size of the optical image formed on the CCD image sensor 19 varies with the magnification of the lens unit 18, and thus shading conditions of the optical image on the CCD image sensor 19 varies with the magnification of the lens unit 18, the shading correction data Cnm of one frame should be determined with respect to each of available magnifications of the lens unit 18. Since the CCD image sensor 19 has 3,200,000 pixels in the present embodiment, a very large memory capacity is needed for storing the shading correction data Cnm for the individual pixels with respect to different magnification steps. In order to reduce the volume of the shading correction data Cnm, four adjoining pixels of the same row are grouped together, and a shading correction coefficient C is determined for each group at each magnification. Thereby, 800,000 (=3,200,000/4) correction coefficients C are determined and registered as the shading correction data Cnm for the 3,200,000 pixels with respect to each magnification. Thus, it comes to be possible to store the shading correction data Cnm for a variety of magnification steps. It is to be noted that the number and arrangement of pixels constituting one group may be modified appropriately.

In the present embodiment, when the full size frame of the ISO135 type or 35 mm size photo film is designated in the shading correction data taking mode, the shading correction data Cnm are obtained with respect to the four colors R, G, B and IR, while changing the magnification of the lens unit 18 to 0.43×, 0.6×, 0.65×, 0.72× and 0.82×. The shading correction data Cnm for the ISO135 type are also used for IX240 type photo filmstrip. Concretely, the shading correction data Cnm obtained at the magnification of 0.43× and at the magnification of 0.6× are used for correcting image data picked up from the ISO135 type picture frame by the pre-scanning and the fine-scanning respectively. On the other hand, the shading correction data Cnm obtained at 0.65× and at 0.72× are used for image data picked up from the IX240 type picture frame by the pre-scanning and the fine-scanning respectively. The shading correction data Cnm detected at 0.82× are used for cropping.

When the Brownie film, i.e. ISO120 type and ISO220 type, is designated in the shading correction data taking mode, the shading correction data Cnm are obtained with respect to the four colors R, G, B and IR, while changing the magnification sequentially to 0.27×, 0.31×, 0.39×, 0.5×, 0.7× and 0.82×. The shading correction data Cnm obtained at the magnification of 0.27× are used for correcting image data picked up from the full size frame (6×9 cm) of the Brownie film by the pre-scanning and the fine-scanning as well. The shading correction data Cnm obtained at other magnification steps are used for image data cropped from a central area of the picture frame.

The data writing section 52 writes the shading correction data Cnm for the respective magnification steps on the memory 53 in the order of priority from the most frequently used magnification to the least frequently used magnification. That is, the priority depends upon how frequently the lens magnification related to the shading correction data is used for scanning the image. In other words, the priority depends upon the frequency of use of the shading correction data. If the memory locations of the memory 53 are substantially filled with the shading correction data Cnm, and the shading correction data Cnm for another magnification step cannot be written on the memory 53, the data writing section 52 writes those shading correction data Cnm in a predetermined memory location of the hard disc 54.

Figure 4:
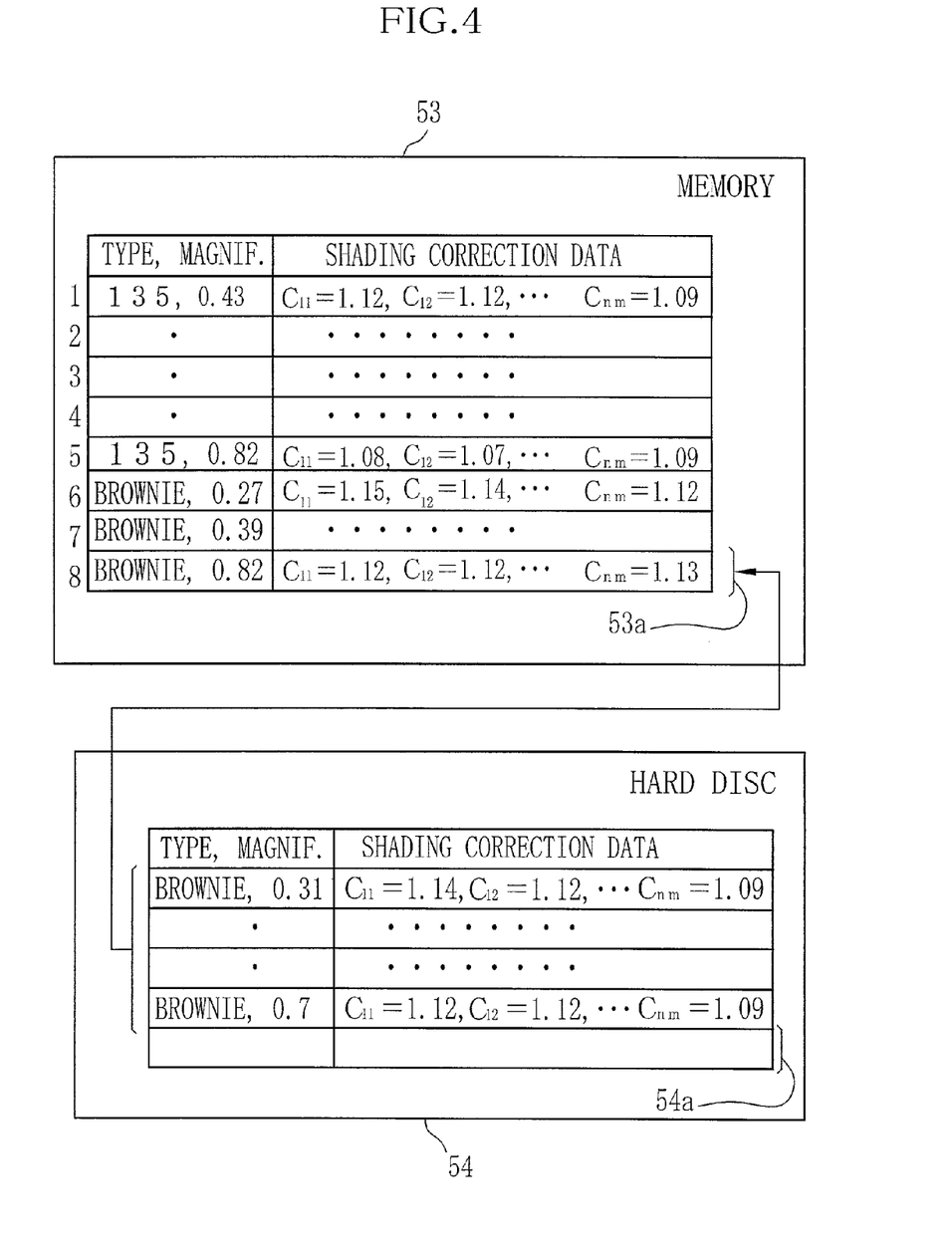
FIG. 4 shows an explanatory diagram illustrating an operation of interchanging shading correction data between a memory and a hard disc of the image scanner.

The memory 53 has a capacity of 128 Mbyte in the present embodiment, and it takes about 16 Mbyte to store the shading correction data Cnm of one for each magnification step, on the assumption that the shading correction data of one frame consist of 8,000,000 correction coefficients. Consequently, the memory 53 can store the shading correction data for 8 magnification steps, as shown in FIG. 4, and the remaining shading correction data Cnm for other magnification steps are stored in the hard disc 54. Since the above five magnification steps determined for the ISO135 type are most frequently used, the shading correction data for the five magnification steps are written on the memory 53. In the remaining three memory locations of the memory 53 stores the shading correction data for the most frequently used three magnification steps for the Brownie type, e.g. 0.27×, 0.31× and 0.82×. The shading correction data for the remaining magnification steps are written on the predetermined location in the hard disc 54.

When an image is to be scanned at one of those magnifications for which the shading correction data are stored in the hard disc 54, the data rewriting section 55 first transfers the shading correction data for the least frequently used magnification among those stored in the memory 53 to a predetermined vacant location 54a of the hard disc 54. Which provides a vacant location 53a in the memory 53 is Thereafter, the data rewriting section 55 transfers the shading correction data for the requested magnification from the hard disc 54 to the memory location 53a. This way, the shading correction data are interchanged between the memory 53 and the hard disc 54.

In the shading corrector 56, the digital image signals are corrected by being multiplied by the shading correction data in pixel-to-pixel correspondence. The corrected image signals are sent as image data to the image processing section 12. Since the image signals are corrected with the shading correction data that are stored in the memory 53, it takes less time for the shading correction than where the shading correction data are sequentially read out from the hard disc 54.

In the above embodiment, the shading correction data that are to be used on the next scanning but are stored in the hard disc 54 are written on the memory 53 in place of the shading correction data for the least-frequently used magnification among the eight sets of shading correction data stored in the memory 53. In alternative, the eighth memory location 53a of the memory 53 may be served as a specific location for those shading correction data which are read out from the hard disc 54.

Figure 5:
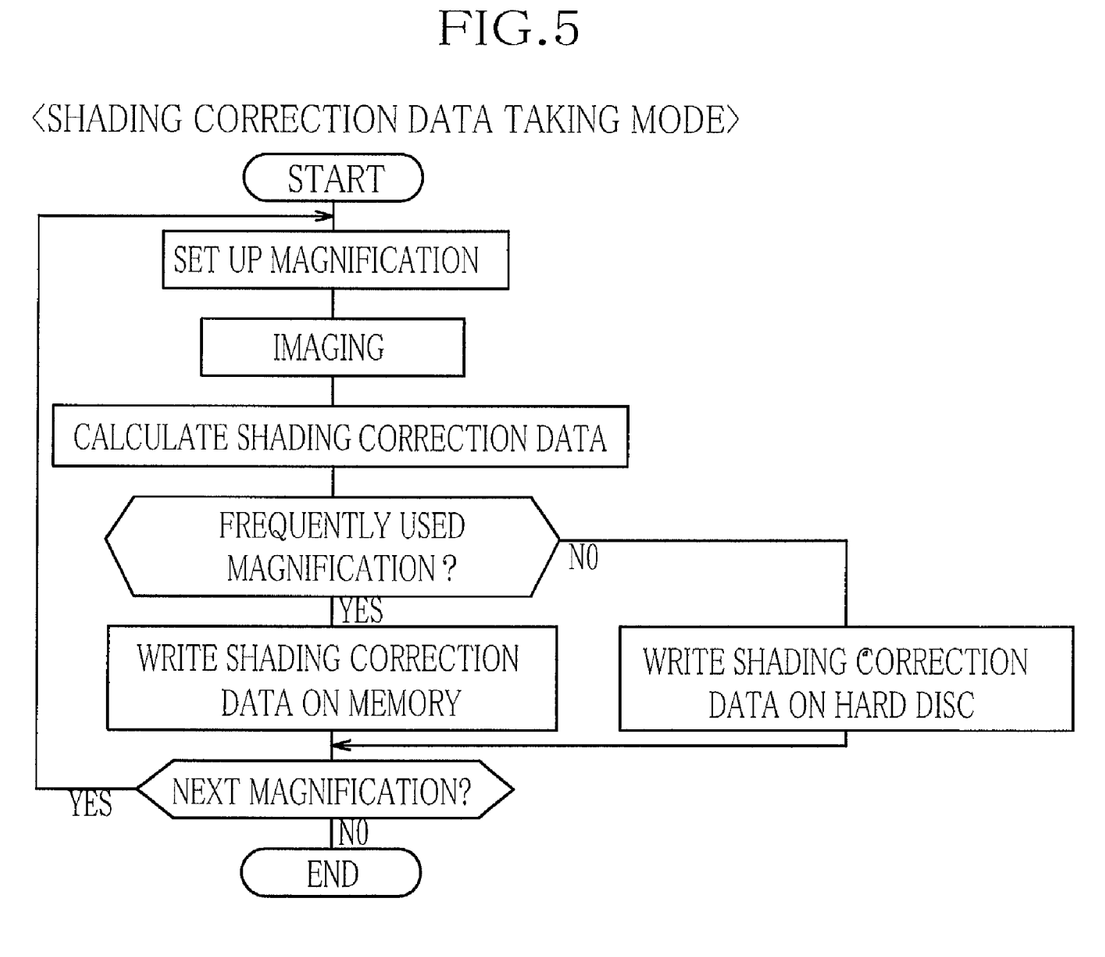
FIG. 5 shows a flow chart illustrating a sequence of obtaining shading correction data.
Figure 6:
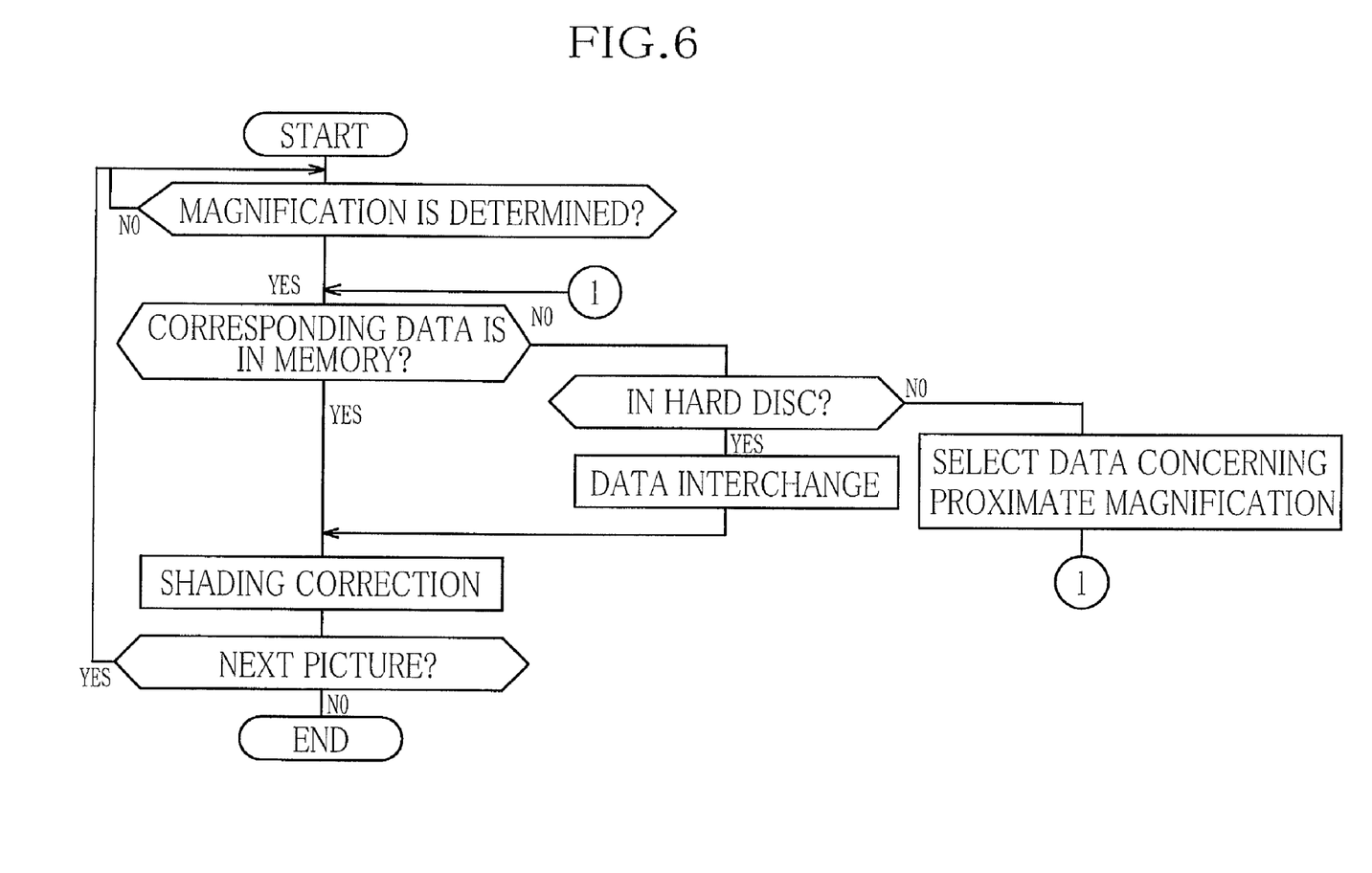
FIG. 6 shows a flow chart illustrating a sequence of shading-correction process for an image read out from an original.
Figure 7:
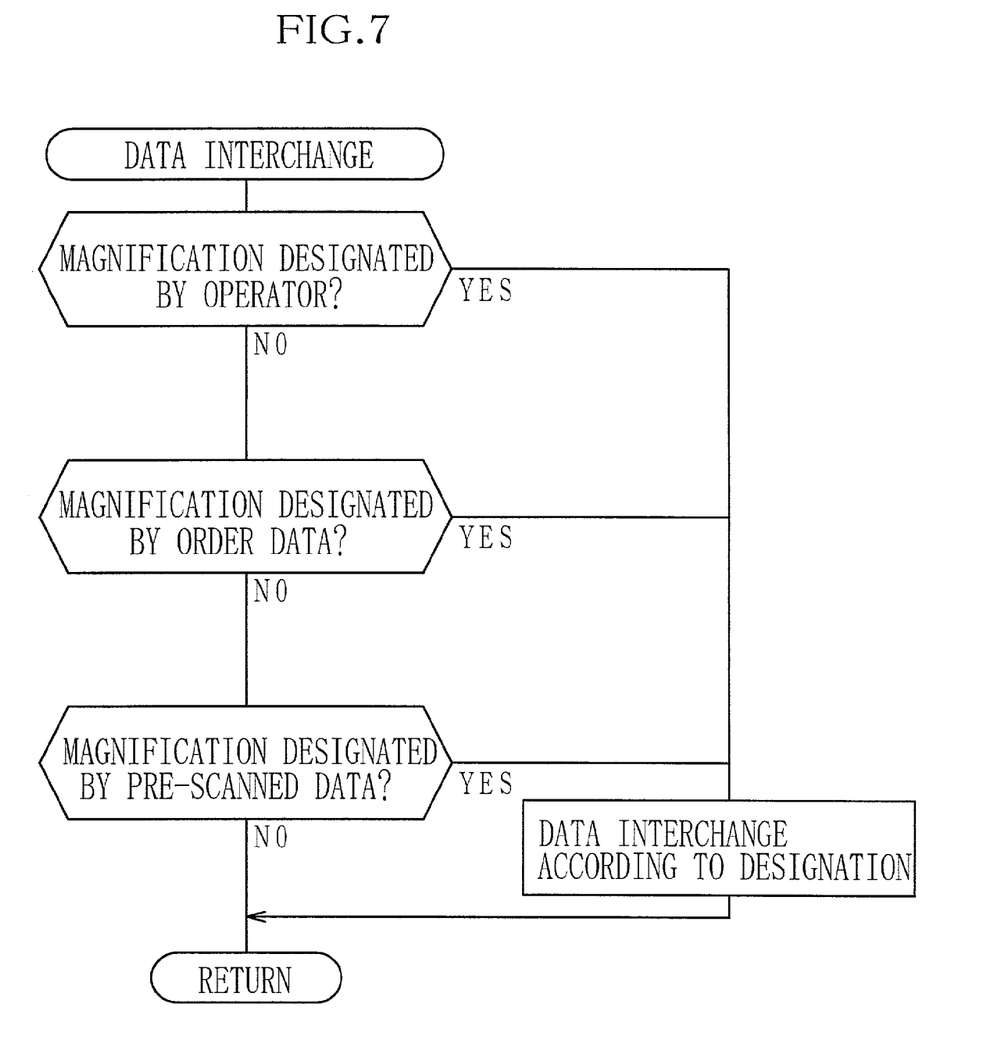
FIG. 7 shows a flow chart illustrating a sequence of interchanging shading correction data between the memory and the hard disc.

Now the operation of the digital photo-lab system 10 will be described with reference to FIGS. 5 to 7.

Immediately after being powered, the image scanner 11 is automatically set to the shading correction data taking mode. In this mode, the shading correction data are determined in the sequence as shown in FIG. 5. First, the imaging section 20 is set at a magnification determined by the designated film type or film size, and image signals are picked up through the CCD image sensor 19 without placing the photo filmstrip 21 in the film carrier 17, as shown in FIG. 2. Specifically, when the film carrier 17 and the diffusion box 16 placed in the imaging section 20 are for the ISO135 type, the shading data pick up section 50 first outputs a signal for setting the magnification at 4.3×. Then, the LEDs 15R, 15G, 15B and 15IR are sequentially driven to project red rays, green rays, blue rays and infrared rays, one color after another toward the film carrier 17 in which no filmstrip is placed but merely the upper and lower masks 33 and 34. Thus, image signals are obtained from the illumination light of the respective colors.

In the correction data calculator 51, the shading correction data are obtained for each color from the image signals of the individual color, in the way as set forth above. The shading correction data for the respective colors obtained at the same magnification are grouped together and sent to the data writing section 52. The data writing section 52 writes the shading correction data on the memory 53 if the magnification relating to these shading correction data is one of those frequently used for scanning. Otherwise, the data writing section 52 writes the shading correction data on the hard disc 54. Thereafter, the imaging section 20 is changed to the predetermined next magnification, and the same operations are executed for obtaining the shading correction data for this magnification. In the present embodiment, the magnification is seriatim set at 0.43×, 0.6×, 0.65×, 0.72× and 0.82× for the ISO135 type, and the shading correction data for these five magnification steps are written sequentially on the memory 53.

Thereafter, to obtain the shading correction data for the Brownie type, the film carrier 17 and the diffusion box 16 for the ISO135 type are replaced with those for the Brownie type or ISO120 type in the shading data pickup mode. Then, image signals are picked up through the CCD image sensor 19 without placing any film, while setting the magnification at 0.27×, 0.31×, 0.39×, 0.5×, 0.7× and 0.82×. The shading correction data obtained at the respective magnifications for the Brownie type are written either on the memory 53 or on the hard disc 54 depending upon the frequency of use of the corresponding magnification, in the way as set forth above. When the shading correction data are detected concerning all of the expected magnification steps, the shading correction taking mode is concluded.

In the image scanning, the photo filmstrip 21 is placed in the film carrier 17 or another type filmstrip, e.g. the Brownie type, is placed in the film carrier for this film type, and image signals are detected from an individual picture frame on the filmstrip. In correspondence with the magnification of the imaging section 20 used in picking up the image signals, the shading correction data for use in correcting those image signals are determined. If the shading correction data for that magnification are written on the memory 53, these shading correction data are used. If the shading correction data for that magnification are written on the hard disc 54, these shading correction data are read out from the hard disc 54, and are written on the memory 53 in place of the shading correction data concerning the least frequently used magnification among those stored in the memory 53.

If neither the memory 53 nor the hard disc 54 store such shading correction data that are related to the used magnification, the shading correction data concerning the nearest magnification to the used magnification are retrieved from the memory 53 or the hard disc 54. Also in that case, if the shading correction data are retrieved from the hard disc 54, these data are interchanged with the shading correction data for the least frequently used magnification among those stored in the memory 53. Accordingly, even when the shading correction data concerning the used magnification are not written on the memory 53 or on the hard disc 54, the image signals are promptly and almost properly corrected with the shading correction data for the nearest magnification to the used magnification, without the need for obtaining a new set of shading correction data concerning this magnification.

The image scanner 11 makes the pre-scanning and the fine-scanning on the individual picture frame. In the present embodiment, the pre-scanning is carried out while feeding the filmstrip in one direction and, thereafter, the fine-scanning is carried out while feeding the filmstrip in the opposite direction. However, the fine-scanning may be carried out while feeding the filmstrip in the same direction as for the pre-scanning after feeding the filmstrip back to an initial position. It is also possible to make the pre-scanning and the fine-scanning successively on each picture frame.

The image processor 12 sorts out improper pixels suffering from the scratches or stains on the film surface or the like, on the basis of the image data of infrared, and corrects the three-color image data of these pixels. Thereafter, the three-color image data are subjected to conventional image processing, including trimming, electronic zooming, gradation correction, sharpness correction and so forth. Based on the image data thus corrected and processed in the image processor 12, a simulation image of a finished print is displayed on the monitor 45.

The operator observes the simulation image and, if the image is satisfactory, enters the print command by operating the keyboard 36a. If it is determined to be necessary to correct the density or the colors, the operator enter correction values by operating the keyboard 36a. In accordance with the entered correction values, a corrected simulation image is displayed on the monitor 45. When the print command is entered, the processed three-color image data are sent to the image output apparatus 13. The image processing is conducted on the image data of the respective picture frames to print.

On the basis of the image data from the image processor 12, the image output apparatus 13 prints a latent image on the color photographic paper in the laser printer section 47, and processes the photographic paper for development in the photographic processor section 48.

In the above embodiment, when an image is scanned at a magnification for which there are not any specific shading correction data in the memory 53 or the hard disc 54, those shading correction data concerning the nearest magnification to that magnification are retrieved from the memory 53 or the hard disc 54 instead. In alternative, those shading correction data concerning a magnification that is adjacent to the used magnification may be substituted for the shading correction data of the used magnification. In that case, it is preferable to use those concerning the higher magnification than the used one, because vignetting can be resulted from the use of the shading correction data concerning the lower magnification.

In the above embodiment, the film carrier and the diffusion box are replaced with those specific for the Brownie type film when taking the shading correction data for the Brownie film after the shading correction data are taken at the magnification steps for the ISO135 type film while using the film carrier 17 and the diffusion box 16 for the ISO135 type. This is because the frame size of the Brownie type is certainly larger than that of the ISO135 type, so the illumination area should be enlarged, and the shading data of the enlarged illumination area should be newly detected. However, if the film carrier, the film masks and the diffusion box are set for a film type of a larger frame size, e.g. the Brownie type, it is possible to detect the shading data of a smaller illumination area for a film type of a smaller frame size, e.g. the ISO135 type, just by changing the film masks to the smaller size.

Although in the above embodiment the shading correction data concerning the least frequently used magnification among those stored in the memory 53 are automatically replaced with the shading correction data that are not stored in the memory 53 but relate to the magnification applied to the next scanning, the shading correction data to be replaced with the shading correction data to use next can be another set of shading correction data. According to an embodiment shown in FIG. 7, the data interchange between the hard disc 54 and the memory 53 may be carried out in accordance with a command entered by the operator, print order data entered in the system controller 36, or data detected by the pre-scanning.

For instance, when the operator designates one or more magnification steps to be used for scanning the following images through the keyboard 36*a*, or if the magnification to be used next is determined by the print order data, those shading correction data which are not expected to be used next are transferred from the memory 53 to the hard disc 54. If it is detected through the pre-scanning that there are one or more panoramic size picture frames among the picture frames to scan, shading correction data concerning a magnification for the panoramic size are maintained stored in the memory 53, and those shading correction data which are not expected to be used next are transferred from the memory 53 to the hard disc 54. Not only the data interchange between the memory 53 and the hard disc 54, but also the order of priority on writing the shading correction data on the memory 53 in the shading correction data taking mode may be determined on the basis of the data of magnification entered by the operator, the print order data, or the data obtained by the pre-scanning.

Although the shading data are detected by picking up image signals through the CCD image sensor 19 while the filmstrip 21 is removed from the film carrier 17 in the above embodiment, it is alternatively possible to detect the shading data while placing an unexposed but processed negative film 60, as shown in FIG. 2. Instead of the unexposed but processed negative film 60, an ND (neutral density) filter 61 or a color filter that has uniform density and color may be used.

In the above embodiment, the remaining shading correction data which the memory 53 cannot store are written on the hard disc 54. As the subsidiary memory device, however, any other kinds of storage media is usable, including CD-R 65, DVD 66, MO 67, memory cards 68 of various kinds, like Smart Media (a trade name), Memory Stick (a trade name), IC card, as shown in FIG. 3. For this purpose, the image scanner 10 should be provided with a driver 70, 71, 72 or 73 for the additional storage medium 65, 66, 67 or 68, and the overflowing shading correction data are written on the additional storage medium through the driver.

Although the lens unit 18 is a fixed focus lens in the imaging section 20 of FIG. 1, the present invention is applicable to an image scanner that uses a zoom lens, a turret type image forming lens system, or an interchangeable image forming lens. The film types or the frame sizes and thus the lens magnifications are not to be limited to the above embodiment, but these are modified appropriately.

Figure 8:
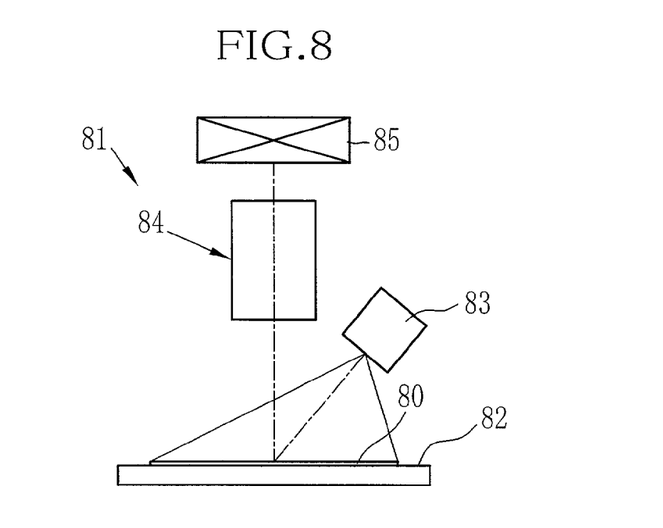
FIG. 8 shows a schematic diagram illustrating an image scanner for reflective originals, according to another embodiment of the present invention.

Although the image scanner 11 is a film scanner for scanning images on a photo filmstrip, the present invention is applicable to an image scanner for reflective originals. In that case, as shown in FIG. 8, a reflective original 80 is put on a specific table 82 of the image scanner 81, and is illuminated with light from a light source unit 83. Reflected light from the original 80 is projected through a lens unit 84 as an optical image onto a CCD image sensor 85. To obtain shading correction data in this embodiment, a reflective original having uniform reflective density or reflectance is put on the table 82, and image signals are picked up while setting the lens unit 84 sequentially at different magnifications in the same way as described with respect to the first embodiment. The obtained shading correction data are written either on a specific memory or on a subsidiary storage medium depending upon the demand for these data, e.g., how frequently the data are used, or in accordance with some sequence designated by the operator, determined by the print order data, or the like. When the shading correction data stored in the subsidiary storage medium are used, these data are transferred to the specific memory. The image sensor 19 or 85 is not limited to the CCD type, but may be another kind of image sensor.

Thus, the present invention is not to be limited to the above embodiments but, on the contrary, various modifications will be possible to those skilled in the art without departing from the scope of claims appended hereto.

What is claimed is:

1. An image scanner comprising:
an image sensor for photoelectrically converting an optical image into image signals;
a light source for projecting rays toward a scanning position;
an image forming lens for forming an optical image on said image sensor from rays traveling through a transparent original or rays being reflected from a reflective original as placed in said scanning position, said image forming lens being changeable in magnification;
a first storage medium for storing at least one of a plurality of sets of shading correction data prepared for a plurality of magnification steps of said image forming lens, one set for one magnification;
a second storage medium for storing at least a second set of shading correction data which are prepared for a second one of said plurality of magnification steps of said image forming lens, and are not stored in said first storage medium;
a data writing device that reads out said second set of shading correction data from said second storage medium and writes said second set of shading correction data on said first storage medium if said image forming lens is set at said second magnification step; and
a shading correction device for correcting image signals from said image sensor with a set of shading correction data that are read out from said first storage medium in correspondence with the magnification used on picking up said image signals.

2. An image scanner as recited in claim 1, wherein said first storage medium is a RAM, and said second storage medium is a hard disc, CD, DVD, MO or a memory card.

3. An image scanner as recited in claim 1, further comprising a shading correction data taking device for taking the shading correction data for the plurality of magnification steps of said image forming lens, wherein the shading correction data taken by said shading correction data taking device are written on either said first storage medium or said second storage medium by said data writing device according to a predetermined sequence.

4. An image scanner as recited in claim 3, wherein said image scanner is designed to scan a picture frame photographed on a filmstrip, and said shading correction data taking device derives the shading correction data from those image signals picked up through said image sensor without placing any original in said scanning position, or while placing an unexposed but developed negative filmstrip or a filter with an uniform transmittance density in said scanning position.

5. An image scanner as recited in claim 3, wherein said image scanner is designed to scan a reflective original, said shading correction data taking device derives the shading correction data from image signals picked up through said image sensor while a blank sheet with an uniform density is placed in said scanning position.

6. An image scanner as recited in claim 3, wherein said light source emits rays of at least three primary colors successively from one color to another to each original, and said shading correction data taking device derives shading correction data for each color at each magnification step of said image forming lens.

7. An image scanner as recited in claim 3, wherein said data writing device writes the shading correction data first on said first storage medium in the order from the most frequently used one to less frequently used one, and then writes those shading correction data on said second storage medium, which cannot be written on said first storage medium.

8. An image scanner as recited in claim 3, wherein said data writing device writes said second set of shading correction data as read out from said second storage medium on said first storage medium by interchanging said second set of shading correction data with a set of shading correction data which have been stored in said first storage medium.

9. An image scanner as recited in claim 8, wherein said shading correction data to be interchanged with said second set of shading correction data are selected depending upon the frequency of use.

10. An image scanner as recited in claim 9, wherein the least frequently used shading correction data among the shading correction data stored in said first storage medium are selected to be interchanged with said second set of shading correction data.

11. An image scanner as recited in claim 8, wherein said shading correction data to be interchanged with said second set of shading correction data are selected depending upon a command entered by an operator.

12. An image scanner as recited in claim 8, wherein said shading correction data to be interchanged with said second set of shading correction data are selected depending upon ordering data.

13. An image scanner as recited in claim 8, wherein said image scanner carries out pre-scanning of an original at a low resolution and thereafter carries out fine-scanning of the same original at a high resolution, and wherein said shading correction data to be interchanged with said second set of shading correction data are selected depending upon data detected by the pre-scanning.

14. An image scanner as recited in claim 8, wherein if said image forming lens is set at a particular magnification for which neither said first storage medium nor said second storage medium store shading correction data, said shading correction device reads out those shading correction data prepared for a magnification proximate to said particular magnification.

15. An image scanner as recited in claim 8, wherein if said image forming lens is set at a particular magnification for which neither said first storage medium nor said second storage medium store shading correction data, said shading correction device reads out those shading correction data prepared for a magnification adjacent to said particular magnification.

16. An image scanner as recited in claim 15, wherein said adjacent magnification is a magnification higher than said particular magnification.

17. An image scanner as recited in claim 4, wherein when said shading correction data taking device is taking said shading correction data, a masking device is placed in said scanning position in accordance with a designated frame size, and thereafter when a second masking device for a larger frame size than said designated frame size is placed in said scanning position, said shading correction data taking device retakes shading correction data with use of said second masking device.

* * * * *